Sept. 18, 1962 A. S. MELMED ET AL 3,054,989
DIODE STEERED MAGNETIC-CORE MEMORY
Filed Jan. 12, 1960 2 Sheets-Sheet 1
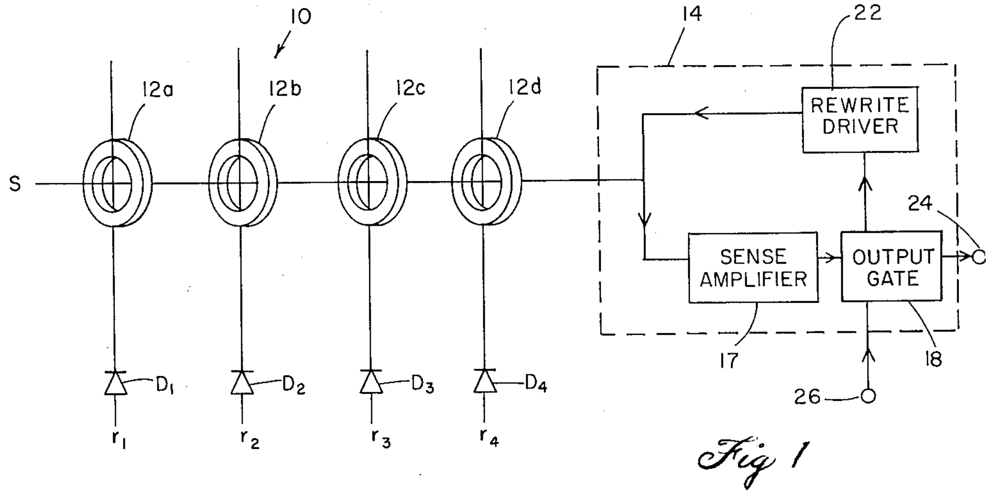
Fig 1
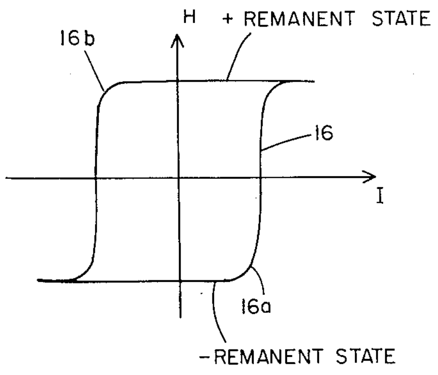
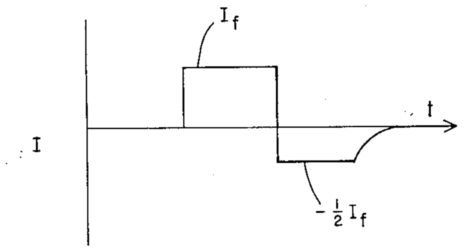
Fig 3
Fig. 2
INVENTORS
ARTHUR S. MELMED
ROBERT T. SHEVLIN
ROBERT LAUPHEIMER
BY
Roland A. Anderson
Attorney Sept. 18, 1962 A. S. MELMED ET AL 3,054,989

DIODE STEERED MAGNETIC-CORE MEMORY

Filed Jan. 12, 1960 2 Sheets-Sheet 2

INVENTORS
ARTHUR S. MELMED
ROBERT T. SHEVLIN
ROBERT LAUPHEIMER

BY Roland A. Anderson
Attorney 3,054,989
DIODE STEERED MAGNETIC-CORE MEMORY

Arthur S. Melmed and Robert T. Shevlin, Flushing, and Robert Laupheimer, Westbury, N.Y., assignors to the United States of America as represented by the United States Atomic Energy Commission

Filed Jan. 12, 1960, Ser. No. 2,086
6 Claims. (Cl. 340—174)

The present invention relates to a word-arranged magnetic-core memory for use in a digital computer and more particularly to a magnetic-core memory utilizing the reverse current property of a semi-conductor diode to half-select, during rewrite, all cores of the word previously read.

Word-arranged magnetic-core memories used in digital computers are commonly provided with a so-called "inhibit line" and a biased switch core to effect a rewrite selection so that the information stored in the memory is restored after being read-out. Typically, such an arrangement in addition to requiring an additional line in flux linking relationship with the magnetic core also requires the use of the address register not only to begin the read-out cycle but again at the end of this cycle for rewrite.

In the present invention, a magnetic-core configuration is devised which makes possible better economy in the use of such memory units. This economy is achieved through use of the reverse current characteristics of a semi-conductor diode which is placed in the current path of the read wire to provide part of the magnetic field necessary to return the core back to its original state after reading.

One consequence of this arrangement is the immediate reduction in the need for certain peripheral equipment. For example, the address register is now needed only at the beginning of the read-out cycle, and during the period of time it would otherwise have been needed for rewrite, it may be used elsewhere or for some other purposes. In addition, the "inhibit line" may frequently be eliminated from the magnetic cores thereby reducing the memory array to a two-wire configuration. Furthermore, the customary array geometry is rearranged to facilitate winding the digit wire as a balanced twisted-pair transmission line so as to eliminate the effect of post-write disturb.

It is thus a first object of this invention to provide a memory unit of economic design.

It is another object to provide a memory circuit in which there is a substantial reduction in the number of conductors utilized for the write, read, sense and rewrite functions. It is a further object of this invention to provide a magnetic-core memory in which the reverse current property of a semi-conductor diode is utilized to help accomplish the rewrite function.

A further object of this invention is to provide a digital magnetic-core memory which utilizes the reverse current characteristic of a semi-conductor diode to permit utilization of two current paths in flux linkage relationship with each magnetic core to accomplish write, read, sense and rewrite functions.

Still another object is to provide a magnetic core array for utilizing a balanced twisted-pair transmission line to eliminate the effect of post-write disturb.

Other objects will hereinafter become more evident when reference is made to the drawings in which:

FIGURE 1 is an elemental memory unit illustrating the principles of this invention;

FIGURE 2 is a hysteresis loop for a typical magnetic core usable in a digital memory system;

FIGURE 3 is a graphical illustration of the reverse current characteristics of a junction germanium diode suitable for use in this invention under the condition that the negative maximum is clamped or circuit-limited to $-\frac{1}{2}I_f$ where $I_f$ is the diode forward or read current.

Figure 4:
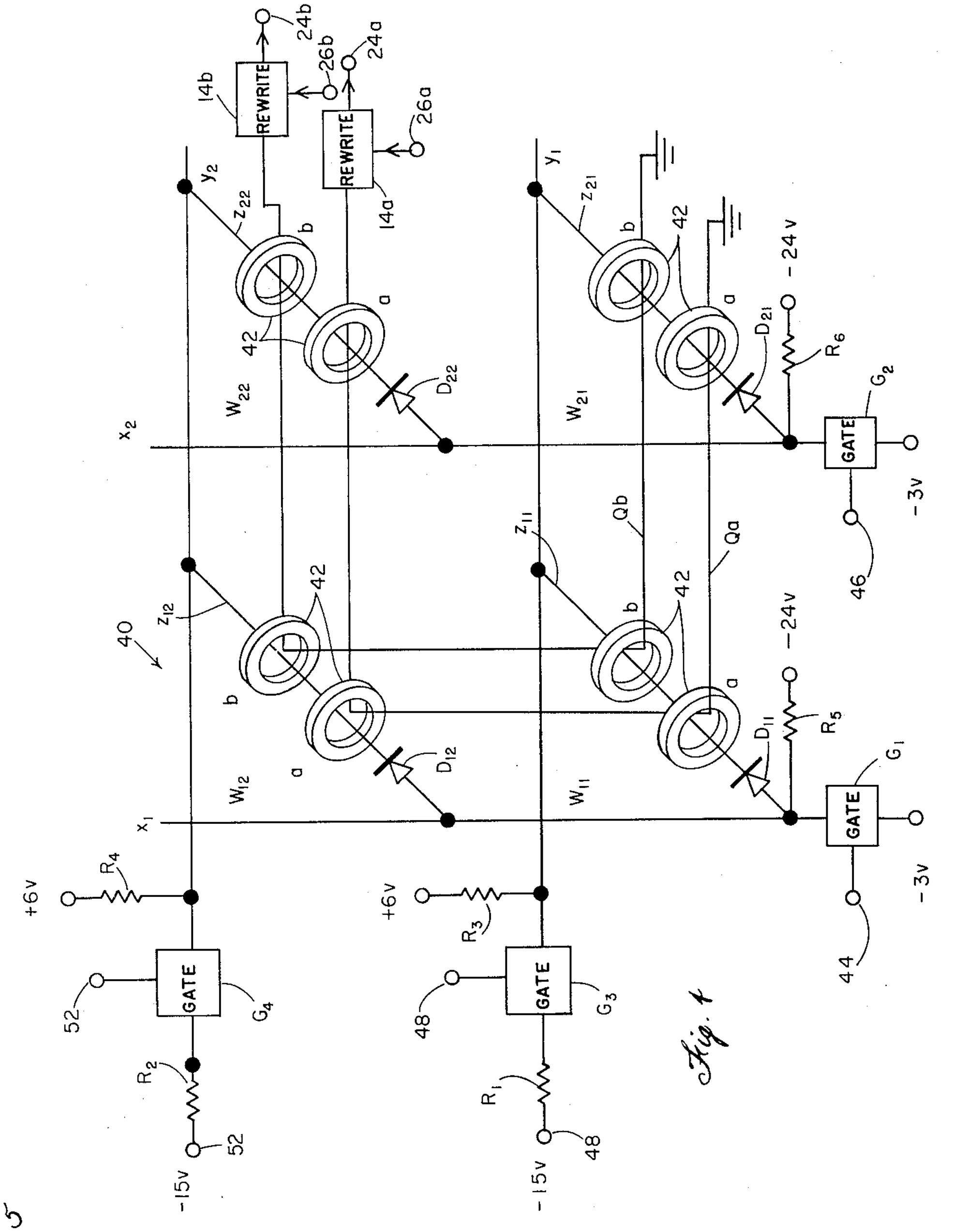
FIGURE 4 is a four word magnetic-core memory embodying the principles of this invention.

FIGURE 1 shows a one word memory unit 10 consisting of four bits exemplified by the ferrite cores 12*a*, 12*b*, 12*c* and 12*d*. A selector line or conductor *s* traverses through the foregoing ferrite cores in flux relationship therewith and is connected into a read and rewrite unit 14 which will be hereinafter more particularly described. Ferrite cores 12*a*, 12*b*, 12*c* and 12*d* have a substantially rectangular hysteresis loop 16 as indicated in the diagram of FIGURE 2. Hysteresis loop 16 is substantially horizontal at bottom and top, with steeply rising sides; i.e., it reflects a high squareness ratio. Suitable materials for this purpose are well known in the art. Typically each of the cores 12*a*, 12*b*, 12*c* and 12*d* is maintained in an induction state represented by its positive or negative remanent state in hysteresis loop 16. As is understood in the art, with a particular core in the negative state, sufficient current in the positive going direction to take the core past knee bend 16*a* in loop 16 will flip the core into the positive state, while a current flow in the negative direction past knee bend 16*b* will flip the core into the negative state of magnetization. The minimum current necessary in the flux linked conductors to switch a core from one state to another may be considered to be of the magnitude I representing at least the full width of the hysteresis loop illustrated in FIGURE 2.

Referring back to FIGURE 1, cores 12*a*, 12*b*, 12*c* and 12*d* are respectively provided with junction diodes D1, D2, D3 and D4 in selector lines *r*1, *r*2, *r*3 and *r*4 respectively oriented as illustrated. These diodes are selected for their back current characteristics. The germanium semi-conductor diode is found to be especially applicable in the present invention as its reverse current is large and readily controlled as will be later seen. Selector lines *r*1, *r*2, *r*3 and *r*4 respectively are placed in flux linking relationship with their respective cores, and are parts of complete circuits (not illustrated) to permit the imposition of pulses as will be hereinafter described. Selector line *s* is connected to the read and rewrite unit 14 which consists of a sense amplifier 17, an output gate 18, and a rewrite driver 22. Output gate 18 delivers the output of unit 14 to an output contact 24, whereas, the gating input signal to output gate 18 is on a gating contact 26 connected thereto. Output gate 18 may be an AND circuit which will pass its input if a pulse is present on contact 26 at the time the input pulse is received. Sense amplifier 17 receives its signal from selector line *s* and delivers its amplified output to gate 18. Rewrite driver 22 is connected in feedback relationship to receive the output signal from gate 18 and return a signal as described below to selector line *s* for a purpose to be described below and an inhibitor pulse to the input of sense amplifier 17. Driver 22 initiates a pulse for a short predetermined interval at the termination of the pulse passing through gate 18.

To indicate the operation of memory unit 10 illustrated in FIGURE 1, reference is first made to the diagram of FIGURE 3 to illustrate essentially the back current characteristics of diodes D1, D2, D3 and D4. One of the heretofore known as undesirable characteristics of a junction diode is that when such a diode is biased with a relatively large value of current in a forward direction it, the diode, will conduct a considerable transient flow in the reverse direction for a short interval of time after being switched immediately to a source of reverse polarity. This transient current is characterized by a very fast rise to a peak followed by a slower decay. It has been found that, if the reverse current peak is circuit-limited to a smaller value, this value will hold steady for an interval of time before dropping to zero. An explanation of this phenomenon is believed to lie in the great number of minority carriers injected into the base of the diode by the biased current, and subsequently swept out by the reverse voltage pulse. As illustrated in FIGURE 3, it has been found that germanium junction diodes are suitable for use with values of the reverse current being of the order of one-half the forward going current, with the pulse duration in the reverse direction being approximately the same as the forward going pulse. The arrangement of FIGURE 1 utilizes this characteristic of the diodes shown graphically in FIGURE 3. For example, biased with a forward current of 400 milliamperes for 1.5 microseconds, in one case the turnover time for the cores at 400 milliamperes drive and circuit-limited in the reverse direction to 200 milliamperes, it is found that the diodes support transient conduction at this amplitude for 1.5 microseconds before turning off, assuming a very high value in the reverse direction. This half-drive reverse value of 200 milliampers permits the rewrite control of the arrangement shown in FIGURE 1.

The arrangement of FIGURE 1 operates as follows:

Diodes D1, D2, D3 and D4 are normally back-biased at some voltage to prevent conduction due to spurious signals. To read out of memory unit 10 the condition of core 12*b*, for example, a pulse is placed on contact 26 of output gate 18 to open the latter. Simultaneously, a pulse in the forward direction is placed on diode D2, in selector line *r*2 causing flow of $I_f$ through selector line *r*2, shown schematically in FIGURE 3. Due to the total flux induced by $I_f$ on selector line *r*2, core 12*b* does not flip, no pulse will be produced on selector line *s* to be passed to contact 24, thereby indicating this particular output or condition of core 12*b*. If core 12*b* flips into a second state this will induce a pulse on selector line *s* which pulse is amplified in unit 17 and delivered to output contact 24. In order to flip core 12*b* back into its original state so that the memory of unit 10 will not be altered by the readout, rewrite driver 22 detects the pulse and produces in response thereto, a current of $\frac{1}{2}I_f$ through selector line *s* immediately following the termination of the readout pulse. This pulse, when combined with the back current $-\frac{1}{2}I_f$ (shown in FIG. 3) through diode D2 immediately following the termination of the forward going pulse, causes core 12*b* to flip back to its original state, and so the back current characteristic of D2 has been utilized to rewrite the information into core 10.

FIGURE 4 illustrates a complete four word magnetic memory system incorporating the principles of this invention. The values given below are for illustrative purposes only to indicate the desired relationships. Memory unit 40 consists of a number of individual magnetizable cores 42 taking the form of small rings as shown and having the square hysteresis loop illustrated in FIGURE 2. Cores 42 are arranged in groups of two forming a plurality of words consisting of two binary digits each, the digits for convenience being labeled *a* and *b*, as illustrated. The number of digits per word may be increased to the number required for a particular application. Two pair of selector lines X1, X2 and Y1, Y2 form the matrix. A word appears at the intersection of each pair of crossing selector lines. For convenience in designating particular words, the word formed at the intersection of selector lines X1 and Y1 is designated W11; and the word formed by cores 42 at the intersection of selector lines X2 and Y1 is designated by W21. At the intersection of each pair of selector lines there is provided a bypass or word selector line generally designated as Z, and in the case of word W11, the line is designated Z11. Word selector line Z11 connects electrically selector lines Y1 and X1 and passes through cores *a* and *b* in flux linking relationship for word W11. A diode D11 in the case of word W11 is inserted in word selector line Z11 with the forward current flow direction being from the X selector line to the Y selector line as illustrated. Similar diodes are provided in the other word selector lines Z. In selector lines X1 and X2, there are provided gates G1 and G2, respectively, and in selector lines Y1 and Y2, gates G3 and G4, respectively. Gates G1 and G2 are connected here to a source of −3 volts and each is provided with a control contact 44 and 46, respectively, for opening its gate to the −3 volt source, as is understood in the art. In a similar manner gates G3 and G4 are connected to a voltage sink of −15 volts through resistors R1 and R2, respectively, with similar control contacts 48 and 52 provided. When gates G1, G2, G3 and G4 block current flow, back-biasing on diodes D11, D12, D21, and D22 is provided by voltage source +6 volts and sink −24 volts connected through resistors R3, R4 and R5, R6 respectively. By the foregoing arrangement diodes D12, D22, D11 and D21 are provided with a back voltage of 30 volts when gates G1, G2, G3 and G4 are not alerted. For selecting a particular word for reading out, corresponding bits in each word are connected in flux linking relationship by a bit selector line Q. For example, bit selector line Q*b* interconnects the *b* core in each word between ground and read and rewrite unit 14*b*. A similar selector line Q*a* interconnects the *a* bits and unit 14*a*. Units 14*a* and 14*b* are similar to unit 14 in FIGURE 1, and are provided with the output contacts 24*a*, 24*b* and the alert contacts 26*a*, 26*b* as in the arrangement of FIGURE 1.

To read out word W12, gates G1 and G4 are alerted to permit current flow by the insertion of pulses on their control contacts 44 and 52 thereby opening forward current flow of $I_f$ from the −3 volt source to the −15 volt sink through diode D12, causing all of the cores in word W12 to flip into one state if not already in that state. The cores that did flip, as already noted in connection with FIGURE 1, are primed for flipping back due to the back current characteristic of its diode, as diode D12 in word selector line Z12. Simultaneously, the gating pulse is put on contacts 26*b* and 26*a* of read and rewrite units 14*b* and 14*a*, so that pulses on contacts 24*a* and 24*b* are found in only each bit which flipped into a new state. As previously described, units 14*a* and 14*b* return a rewrite pulse where a readout pulse occurred to combine with the back current pulse from diode D12 to return the bits which flipped into a new state.

A four word model memory of the type shown in FIGURE 4 was constructed and made to operate satisfactorily. The memory utilized cores RCA type 222M2 (300 to 450 milliamperes for full drive); diodes IN92; the current switching gates used Raytheon transistors, type 2N426, in the X selector lines and type 2N385 in the Y selector lines. Each of the diodes was back-biased at 30 volts, as noted, and after conduction terminated in the forward direction, the back transient current was circuit-limited to a maximum of 200 milliamperes. In the forward direction, current during conduction was 400 milliamperes.

Figure 5:
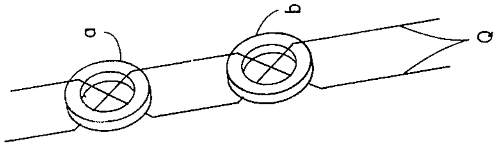
FIGURE 5 is a schematic illustration of digit line wiring utilizing a twisted-pair transmission line.

One of the additional advantages of the core array utilized in this invention is that it permits a further improvement in shortening the cycling time. A principal factor in extending total cycle time is the post-write disturb signal on the bit selector line Q. The positive pulse induced thereon by the flipping of a core is of much greater amplitude than an "undisturbed one" and saturates the input transistor (not shown) in the connected sense amplifier 17, prohibiting its use and extending the total cycle time (by about one microsecond in the case cited previously). The load on bit selector line Q is that of the incremental permeability (virtually identical in either the negative or positive state) of all but one of the cores plus the switching load presented by this remaining one; i.e., a sequence of lumped inductors distributed along the length of the line. As part of a loop completed by a ground plane some distance away, this line is also susceptible to stray magnetic fields. By replacing the ground plane with a wire located adjacent to the digit line, the latter can be converted into a two-wire transmission line and terminated in its "characteristic impedance." The two-wire transmission line for bit selector line Q is shown in FIG. 5 interconnecting bit cores in each word.

With this arrangement, the half-select current pulse supplied by the digit line driver now propagates down the line at a ratio determined by the line constants and is absorbed at the receiving end. This prohibits initiating a new "read" or write" cycle for a time equal to the transmission time of the line, since the digit and selector line currents are of opposite sense (in switching a core). However, this time is much less than that of the post-write disturb. In addition, since both wires of the twisted pair are threaded through each core, as shown schematically in FIGURE 5, the amplitude of the current pulse required by the digit line driver is reduced by half, and the twisted-pair transmission line is virtually impervious to stray magnetic fields.

It is thus seen there has been provided a memory core utilizing automatic self rewrite without the use of the address register and an improved arrangement for eliminating post-write disturb. This arrangement accomplishes the more efficient use of the cores without any sacrifice in speed of access into the memory core so that it is possible to use this technique in obtaining large and high speed economical core memory units.

Obviously, many modifications and variations of the present invention are possible in the light of the above teachings. It is therefore, to be understood that within the scope of the appended claims, the invention may be practiced otherwise than as specifically described.

We claim:

1. An information storage apparatus comprising at least one storage element consisting of a magnetic core having nearly rectangular hysteresis properties, an energizing conductor for energizing said core, a diode having a back-current characteristic in said conductor normally back-biased to block current flow, means for delivering an energizing pulse in the forward going direction through said diode to effect a change of state in said core, a selector line connected in energizing relationship with said core for detecting the change of state of said core and delivering a detecting pulse in response thereto, and means for receiving the detecting pulse on said selector line and delivering a pulse back to said selector line beginning at the termination of said detecting pulse for combining with the back-current produced by said diode after removal of said energizing pulse to effect a second change of state of said core thereby accomplishing the rewrite function.

2. An information storage apparatus comprising at least one row of individual storage elements, each consisting of a magnetic core having nearly rectangular hysteresis properties, a plurality of separate independent and unconnected energizing conductors, each conductor common to one of said cores for energizing said core, a diode having a back-current characteristic in each of said conductors normally back-biased to block current flow, means for delivering an energizing pulse in the forward going direction through a diode in the conductor to effect a change of state in a selected core, a selector line connected in energizing relationship with all of said cores in said row for detecting the change of state of said selected core and delivering a detecting pulse in response thereto, and means for receiving the detecting pulse on said selector line and delivering a pulse back to said selector line beginning at the termination of said detecting pulse for combining with the back-current produced by said diode after removal of said energizing pulse to effect a second change of state of said core thereby accomplishing the rewrite function.

3. The storage apparatus of claim 2 in which a two-wire transmission line terminating in its characteristic impedance is used in said selector line for minimizing the post-write disturb signal.

4. An information storage apparatus comprising a plurality of individual storage elements arranged in word groups, each element consisting of a magnetic core having nearly rectangular hysteresis properties, a plurality of energizing conductors in which only one conductor is common to all the cores in one of said word groups, a two axis matrix consisting of two groups of selector lines, there being one selector line from each of both selector line groups being for each word group, each said conductor connecting the two selector lines for their particular word group, a diode having a back-current characteristic in each of said conductors, means connected to said selector lines for normally back-biasing said diodes to block current flow, means included in the latter said means for delivering an energizing pulse in the forward going direction through the diode in the conductor of a preselected word group to effect a change of state in each core of said word group not already in the state determined by said energizing pulse, a bit selector line for each bit position connected in energizing relationship with all of the cores in the same bit position of each word group for detecting the aforesaid change of state of its core in the selected word group and delivering a detecting pulse in response thereto, and means for receiving the detecting pulse on each said selector line and delivering a pulse back to the latter selector line beginning at the termination of said detecting pulse for combining with the back-current produced by the particular diode in the selected word group after removal of said energizing pulse to effect a second change of state of the affected core to return the latter to its original state.

5. The apparatus of claim 4 in which a two-wire transmission line terminating in its characteristic impedance is used in each of said bit selector lines for minimizing the post-write disturb signal.

6. An information storage apparatus comprising a plurality of individual storage elements arranged in word groups, each element consisting of a magnetic core having nearly rectangular hysteresis properties, a plurality of energizing conductors in which each conductor is common to all the cores in one word group, a two axis matrix consisting of first and second groups of selector lines, there being one selector line from each of both selector line groups for each word group, each said conductor connecting the two selector lines for their particular word group, means connected to said selector lines for normally blocking current flow in said conductors, means included in the latter said means for delivering an energizing pulse to the conductor of a preselected word group to effect a change of state in each core of said word group not already in the state determined by said energizing pulse, a bit selector line for each bit position connected in energizing relationship with all of the cores in the same bit position of each word group for detecting the aforesaid change of state of its core and delivering a detecting pulse in response thereto, and means for receiving the detecting pulse on each said selector line and delivering a pulse back to its selector line beginning at the termination of said detecting pulse for coacting with the blocking current means in the particular conductor to effect a second change of state of the affected core to return the latter to its original state.

References Cited in the file of this patent

UNITED STATES PATENTS

| | | |
|---|---|---|
| 2,785,236 | Bright | Mar. 12, 1957 |
| 2,825,820 | Sims | Mar. 4, 1958 |
| 2,874,293 | McMurren | Feb. 17, 1959 |
| 2,910,674 | Wittenberg | Oct. 27, 1959 |

OTHER REFERENCES

"Experiments on a Three-Core Cell etc.," J. Raffel, I. Bradspies: I.R.E. Convention Record, 1955, National Convention, Part 4.